April 27, 1937.  E. E. THRASHER  2,078,817
COMBINATION KITCHEN UTENSIL
Filed Sept. 3, 1936
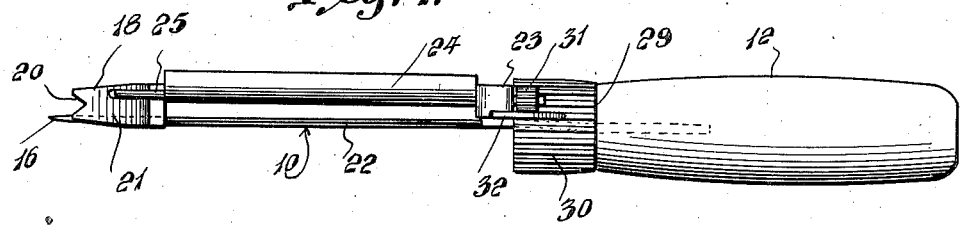
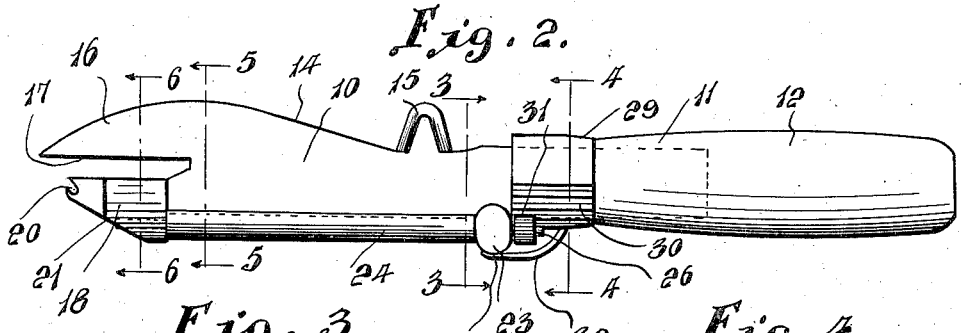
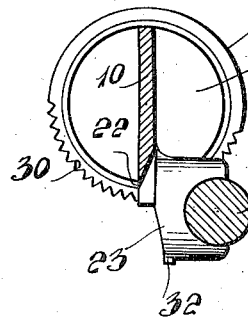
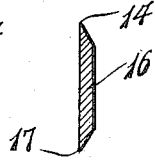
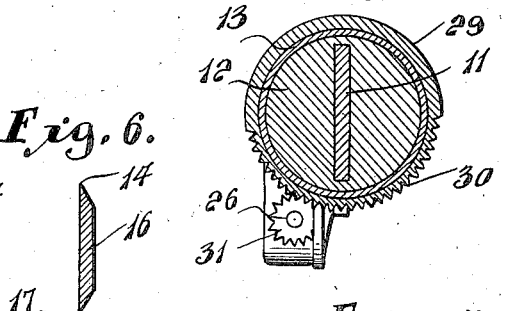
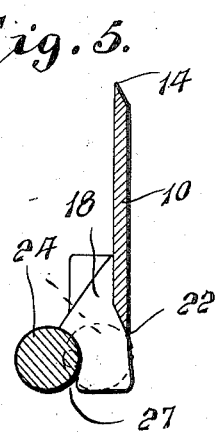
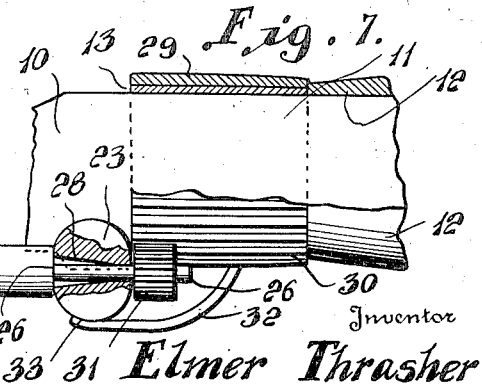
Inventor
Elmer Thrasher
By
Attorney.

Patented Apr. 27, 1937

2,078,817

UNITED STATES PATENT OFFICE 2,078,817

COMBINATION KITCHEN UTENSIL

Elmer E. Thrasher, Cumberland, Md.

Application September 3, 1936, Serial No. 99,322

3 Claims. (Cl. 30—20)

This invention relates to certain new and useful improvements in combination kitchen utensil.

The primary object of the invention is to provide a combination kitchen utensil wherein a can opener, eye pitter, cutter, tack puller and parting knife are embodied in a single structure.

A further object of the invention is to provide a combination kitchen utensil of the foregoing character wherein the paring knife feature thereof has an eccentrically mounted and adjustable guard roller associated with the cutting edge of the paring knife to be adjustable relative thereto for varying the depth of cut of the paring knife when used for paring or slicing operations.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a top plan view of the combination kitchen utensil constructed in accordance with the present invention;

Figure 2 is a side elevational view;

Figure 3 is a cross-sectional view taken on line 3—3 of Figure 2, showing the guard bar moved away from the cutting edge of the paring blade;

Figure 4 is a cross-sectional view taken on line 4—4 of Figure 2, showing a pinion eccentrically mounted upon one end of the guard bar and engaged by a rack collar rotatable upon the handle of the utensil;

Figure 5 is a cross-sectional view taken on line 5—5 of Figure 2, showing the eccentric mounting of the guard bar;

Figure 6 is a cross-sectional view taken on line 6—6 of Figure 2, showing the can opener blade and the block that carries the tack puller provided with a notch or slot to form a bearing for one end of the eccentrically mounted guard bar; and Figure 7 is a fragmentary side elevational view, partly in section, showing the bearing for the inner end of the guard bar and the rack collar carried by the handle engaged with the pinion eccentrically mounted on the adjacent end of the guard bar.

Referring more in detail to the accompanying drawing, the combination kitchen utensil embodies a blade 10 having a tang or shank 11 at its inner end that is anchored in a handle 12 with the sleeve or ferrule 13 acting to retain the blade in the handle.

One side of the blade 10 is provided with a cutting edge 14 and said cutting edge adjacent the handle 12 is provided with a laterally projecting sharpened finger 15 constituting an eye pitter especially designed for use in the paring of potatoes, pineapples and the like. The outer end of the blade 10 at the cutting edge 14 thereof is curved to provide a claw 16 with a cutting edge 17 formed on a straight line and constituting a can opener blade. A block 18 is carried by the blade 10 adjacent the outer end and laterally thereof as shown in Figures 1 and 2 to act as an abutment for the can opener blade and the forward end of the block 18 is bifurcated as at 20 to provide a tack puller, the lower side of the block 18 being bevelled as at 21 to provide leverage for the tack puller 20. As shown in Figure 2, the tack puller 20 also functions as a bottle cap remover and at which time the can opener blade is engaged with the top of the cap to provide leverage.

The straight edge 22 of the blade 10 opposite the curved edge 14 constitutes a paring knife and a guard rod or bar is associated with the straight cutting edge 22 for varying the thickness of a paring or slice. A block 23 is laterally secured to the inner end of the blade 10 adjacent the ferrule 13 and cooperates with the block 18 to provide bearings for opposite ends of an adjustable guard bar 24 that is illustrated as being circular in cross section in Figure 3.

As shown in Figures 1, 4 and 7, eccentrically disposed pins 25 and 26 respectively project from the outer and inner ends of the guard bar 24, the outer pin 25 being freely journalled in the slotted opening 27 in the outer side wall of the bearing block 18 while the inner pin 26 is journalled in the tapered bearing opening 28 in the inner bearing block 23. The guard bar 24 is adapted to be rotated on its eccentric pin bearings 25 and 26 for varying the position thereof relative to the paring knife edge 22 as will be understood from an inspection of Figure 5, the adjustment of the guard bar 24 positioning the same in substantially overlapping relation to the cutting edge 22 when the paring knife is out of use for the protection of the cutting edge and for the protection of the user of the utensil.

Means is provided for adjusting the guard bar 24 relative to the cutting edge 22 of the paring knife and for holding the guard bar in adjusted position to vary the thickness of a peeling or slice and includes a collar 29 rotatable upon the ferrule 13 with a peripheral rack portion 30 on the collar 29 that has meshing engagement with a pinion 31 secured to the inner projecting end of the bearing pin 26 for the guard bar 24. When the collar 29 is rotated upon the ferrule 13, the pinion 31 is rotated thereby and such movement is transmitted to the guard bar 24, the eccentric mounting of the pins 25 and 26 for the guard bar causing the latter to occupy the positions illustrated by full and dotted lines in Figure 5 as well as positioned therebetween. A spring finger 32 has one end thereof anchored as at 33 to the other side of the bearing block 23 with the free end of the spring pin 32 positioned for ratcheting engagement with the rack teeth 30 upon the collar 29, the spring finger 32 cooperating with the collar 29 to retain the guard bar 24 in its adjusted position. The guard bar 24 is placed in position by first inserting the pin 26 in the tapered bearing opening 28 in the bearing block 23, the outer end pin 25 being then lowered into the bearing slot 27 and thereafter the pinion 31 is anchored to the inner end of the bearing pin 26 to cooperate with the bearing block 23 for holding the guard bar in position.

From the above detailed description of the invention, it is believed that the construction and use thereof will at once be apparent and while there is herein shown and described the preferred embodiment of the invention, it is nevertheless to be understood that minor changes may be made therein without departing from the spirit and scope of the invention as claimed.

I claim:—

1. In a combination kitchen utensil, a knife including a blade and handle, the blade having a straight paring knife edge, a longitudinally extending guard bar adjustably mounted relative to the paring knife edge for regulating the thickness of a peeling or slice and to provide a guard for the cutting edge when the same is out of use, the mounting for the guard bar including bearing blocks, an eccentric pin projecting from each end of the bar journalled in the blocks, and rack and pinion mechanism for rotating the pins for swinging the guard bar toward and away from the cutting edge.

2. In a combination kitchen utensil, a knife including a blade and handle, the blade having a straight paring knife edge, a longitudinally extending guard bar adjustably mounted relative to the paring knife edge for regulating the thickness of a peeling or slice and to provide a guard for the cutting edge when the same is out of use, the mounting for the guard bar including bearing blocks, an eccentric pin projecting from each end of the bar journalled in the blocks, a pinion on the inner end of the inner end pin and a rack collar rotatable on the handle engaged with the pinion and adapted to be rotated for swinging the guard bar toward and away from the cutting edge.

3. In a combination kitchen utensil, a knife including a blade and handle, the blade having a straight paring knife edge, a longitudinally extending guard bar adjustably mounted relative to the paring knife edge for regulating the thickness of a peeling or slice and to provide a guard for the cutting edge when the same is out of use, the mounting for the guard bar including a stationary bearing block for each end of the guard bar projecting laterally of the blade adjacent said cutting edge, and an eccentric pin carried by each end of the guard bar journaled in the adjacent bearing block whereby the guard bar may be moved in an arcuate path toward and away from the cutting edge and cooperating means carried by the guard bar and handle for limiting movements of the guard bar.

ELMER E. THRASHER.